(12) United States Patent
Bauer et al.

(10) Patent No.: US 9,388,853 B2
(45) Date of Patent: Jul. 12, 2016

(54) BEARING ELEMENT FOR TWO SPATIAL DIRECTIONS

(71) Applicant: Schaeffler Technologies AG & Co. KG, Herzogenaurach (DE)

(72) Inventors: Jorg Bauer, Erlangen (DE); Peter Siebke, Herzogenaurach (DE); Armin Bender, Herzogenaurach (DE); Stefan Ruhl, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/430,580

(22) PCT Filed: Aug. 6, 2013

(86) PCT No.: PCT/DE2013/200101
§ 371 (c)(1),
(2) Date: Mar. 24, 2015

(87) PCT Pub. No.: WO2014/048423
PCT Pub. Date: Apr. 3, 2014

(65) Prior Publication Data
US 2015/0219150 A1   Aug. 6, 2015

(30) Foreign Application Priority Data
Sep. 25, 2012   (DE) .................. 10 2012 217 241

(51) Int. Cl.
*F16C 29/04* (2006.01)
*F16C 29/00* (2006.01)

(52) U.S. Cl.
CPC ............ *F16C 29/04* (2013.01); *F16C 29/001* (2013.01); *F16C 29/002* (2013.01); *F16C 29/008* (2013.01)

(58) Field of Classification Search
CPC .... F16C 29/002; F16C 29/008; F16C 29/001; F16C 29/046; F16C 33/46; B23Q 1/62
USPC .................. 384/9, 11, 18–19, 42, 44, 49–51, 384/54–55, 52, 56
See application file for complete search history.

(56) References Cited

U.S. PATENT DOCUMENTS 2,607,636 A * 8/1952 Michelsen ............... B23Q 1/26
384/49
3,204,584 A * 9/1965 Mladjan ................... B23Q 1/26
108/143
3,903,536 A * 9/1975 Westerberg ............. G03F 7/704
355/53

(Continued)

FOREIGN PATENT DOCUMENTS

CH        389669       7/1965
EP        0072869      3/1983

(Continued)

*Primary Examiner* — Marcus Charles
(74) *Attorney, Agent, or Firm* — Volpe and Koenig, P.C.

(57) ABSTRACT

A bearing element for two spatial directions, including a series of first rolling bodies (1), which roll on a first side (2) of an intermediate part (3) in a first direction, and a series of second rolling bodies (4), which roll on a second side (5) of the intermediate part and on a fastening part (6) in a second direction that differs to the first direction, the fastening part having a shaft (7), and a spring element (8) being arranged around the shaft. This bearing element addresses the problem of providing a bearing element for two spatial directions, which can absorb great forces perpendicularly to the two spatial directions and which is of compact design.

7 Claims, 1 Drawing Sheet

(56) References Cited

U.S. PATENT DOCUMENTS

| | | | | |
|---|---|---|---|---|
| 4,113,223 | A | * | 9/1978 | Kakizaki ................ B23Q 1/621 108/143 |
| 5,511,461 | A | * | 4/1996 | Miyachi ................. B23Q 11/08 92/13.5 |
| 5,638,156 | A | * | 6/1997 | Dehli ..................... G09F 19/18 355/40 |
| 5,760,500 | A | * | 6/1998 | Kondo ................... H02K 41/02 248/913 |
| 7,025,319 | B2 | * | 4/2006 | Willems ............... B60N 2/0715 248/430 |
| 7,070,061 | B1 | * | 7/2006 | Munnekehoff .......... B66D 3/18 212/328 |
| 7,887,239 | B2 | * | 2/2011 | Aida ..................... F16C 29/008 384/42 |
| 2006/0255518 | A1 | | 11/2006 | Steffens et al. |

FOREIGN PATENT DOCUMENTS

| | | | | |
|---|---|---|---|---|
| JP | 2010247245 A | * | 11/2010 | ............ B66C 23/005 |
| WO | 9523267 | | 8/1995 | |
| WO | 2004070228 | | 8/2004 | |

* cited by examiner

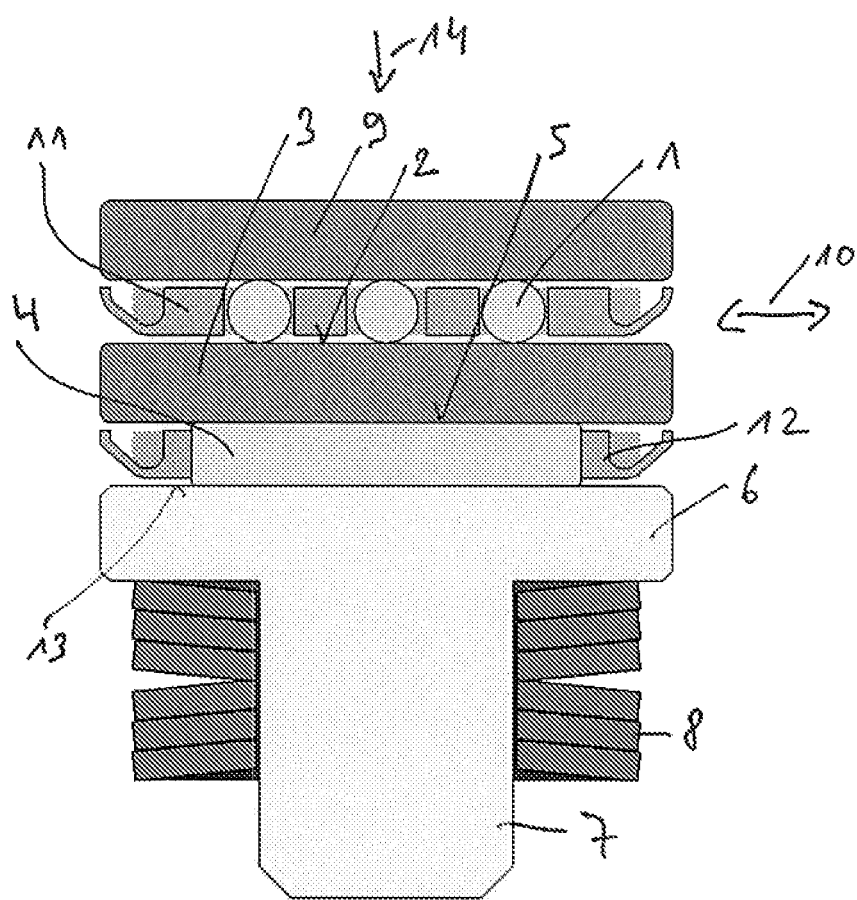

BEARING ELEMENT FOR TWO SPATIAL DIRECTIONS

INCORPORATION BY REFERENCE

The following documents are incorporated herein by reference as if fully set forth: German Patent Application 10 2012 217 241.6, filed Sep. 25, 2012; and PCT/DE 2013/200101, filed Aug. 6, 2013.

FIELD OF THE INVENTION

1. Background

The invention relates to a bearing element for two spatial directions, comprising at least one sequence of rolling bodies which roll on a rolling face.

The requirement often arises from practical experience for it to be possible to absorb slight displacements in two spatial directions of a plane which are, for example, perpendicular with respect to one another, which displacements occur under a high load perpendicularly with respect to the plane.

Plain bearings or bearings with rolling bodies which roll only in one direction usually make it possible only to absorb forces in one spatial direction and have high friction and a low surface pressure, and thus a limited load-bearing capability in the perpendicular direction with respect to the plane of the load.

2. Summary

It is the object of the invention to define a bearing element for two spatial directions, which bearing element can absorb high forces perpendicularly with respect to the two spatial directions and is of small overall design.

According to the invention, this object is achieved by way of a bearing element for two spatial directions, comprising a sequence of first rolling bodies which roll on a first side of an intermediate part in a first direction, a sequence of second rolling bodies which roll on a second side of the intermediate part and on a fastening part in a second direction which differs from the first direction, the fastening part having a shank, and a spring element being arranged around the shank. The intermediate part, on the two sides of which the two rows of rolling bodies roll, brings about the distribution of the load which is absorbed substantially homogeneously by the fastening part. A force which acts on the fastening part perpendicularly with respect to a plane which is defined by the two rolling directions of the two rows of rolling bodies is absorbed at least partially by the spring element which surrounds the shank.

It is preferably provided that the spring element which surrounds the shank comprises a disk spring or a helical spring. In particular, a plurality of disk springs or else a plurality of disk spring assemblies can be provided.

It is preferably provided that the first and/or the second rolling bodies are configured as needles. It is particularly preferably provided that both the first rolling bodies and the second rolling bodies are configured in each case as needles, in particular as needles of identical dimensions, which roll on the common intermediate part in directions which are perpendicular with respect to one another.

It is preferably provided that the first and/or second rolling bodies are guided by a cage. In particular, it is preferably provided that a cage of identical design, for example in each case a needle cage of identical dimensions, is provided for each of the two sequences of rolling bodies.

It is preferably provided that the intermediate part is of planar configuration.

Further advantages and features of the invention result from the dependent claims and from the description of one exemplary embodiment.

In the following text, the invention will be described and explained in greater detail with reference to the appended drawing.

BRIEF DESCRIPTION OF THE DRAWINGS

FIG. 1 shows a partially sectioned view of one exemplary embodiment of a bearing element according to the invention.

DETAILED DESCRIPTION OF THE PREFERRED EMBODIMENTS

FIG. 1 shows a bearing element for two spatial directions, comprising a sequence of first rolling bodies 1 which are configured as needles and roll on a first side 2 of an intermediate part 3 in a first direction, a sequence of second rolling bodies 4 which are likewise configured as needles, to be precise as structurally identical needles with respect to the first needles 1, the second needles 4 rolling on a second side 5 of the intermediate part 3 which is configured as a planar blank and on a fastening part 6 in a second direction which differs from the first direction, the fastening part 6 having a shank 7, and a spring element 8 being arranged around the shank 7.

The spring element 8 comprises two assemblies of disk springs which are stressed against one another and absorb forces in the axial direction, that is to say in the direction of the extent of the shank 7. The shank 7 is received with its end in a receiving bore of a connecting part, against which the at least one disk spring of the spring element 8 bears.

The sequence of first needles 1 rolls on the first side 2 of the intermediate part 3 and on an opposite side of a fastening element 9, the fastening element 9 either being connected directly to the part to be mounted or forming a gap, for example a safety bearing gap. Instead of the fastening element 9, it might also be provided in one modification of the exemplary embodiment which is shown that the first needles 1 or the first rolling bodies roll directly on the part to be mounted.

The first needles 1 can be rotated about a rolling axis which is arranged perpendicularly with respect to the plane of the drawing, to be precise in a first direction, namely in the direction of the arrow 10 in the illustration in FIG. 1. The first needles 1 are guided in a first cage 11 which is configured as a needle cage.

The second needles 4 can be rotated about a rolling axis which is arranged parallel to the plane of the drawing, to be precise in a second direction which lies perpendicularly with respect to the plane of the drawing in the illustration in FIG. 1. The second needles 4 are guided in a second cage 12 which is of structurally identical configuration to the first cage 11.

The second needles 4 roll on the second side 5 of the intermediate part 3 and on a planar face 13, configured as a rolling plane, of the fastening part 6 of substantially T-shaped cross section, the horizontal bar of the T forming the rolling plane of the second needles 4 and the vertical bar of the T forming the shank 7 of the fastening element.

The unit, formed from the fastening element 6 with the shank 7, the spring element 8, the two rows of needles 1, 4, the cages 11, 12 and the intermediate part 3, is arranged within a receptacle, the wall of which laterally delimits the displacement of the cages 11, 12 with the result that a compact structural unit which is possibly already pre-assembled is formed.

The structural unit can absorb forces perpendicularly with respect to the two directions, in which the two rows of needles 1, 4 can be moved, namely in the direction of the extent of the shank 7, that is to say in the axial direction (arrow 14), by way of the at least one spring element 8 which preferably comprises at least one helical spring or at least one disk spring. The needles 1, 4 can roll by in each case a certain magnitude in two spatial directions which are perpendicular with respect to one another (arrow 10 and, respectively, perpendicular with respect to the plane of the drawing), that is to say also perpendicularly with respect to the axial direction (arrow 14).

The above-described bearing element, or the above-described structural unit, in particular a plurality of bearing elements or structural units of this type, can be provided, for example, as a safety bearing or, in order to complement a (for example, axial) safety bearing which is configured as an anti-friction bearing, in order to compensate for thermal expansions in other bearings, as floating bearing or as pedestal bearing housing, in particular also as an abutment in building technology.

In the above-described exemplary embodiment, in each case cages 11, 12 for guiding the needles 1, 4 in the plane were provided. It goes without saying that no cage has to be provided in at least one sequence of rolling bodies which can also be configured as different rolling bodies such as barrel-shaped or frustoconical or cylindrical rolling bodies, in particular in the two sequences of rolling bodies, with the result that two sequences of full-needle rows of rolling bodies are produced in the above exemplary embodiment.

List of Designations

1 First rolling bodies (needles)
2 First side of the intermediate part 3
3 Intermediate part
4 Second rolling bodies (needles)
5 Second side of the intermediate part 3
6 Fastening part
7 Shank
8 Spring element
9 Fastening element
10 First direction (arrow)
11 First cage
12 Second cage
13 Face
14 Axial direction (arrow)

The invention claimed is:

1. A bearing element for two spatial directions, comprising
a sequence of first rolling bodies which roll on a first side of an intermediate part in a first direction,
a sequence of second rolling bodies which roll on a second side of the intermediate part and on a fastening part in a second direction which differs from the first direction,
the fastening part having a shank, and
a spring element being arranged around the shank, wherein at least one of the first or the second rolling bodies are configured as needles.

2. The bearing element as claimed in claim 1, wherein the spring element which surrounds the shank comprises a disk spring or a helical spring.

3. The bearing element as claimed in claim 1, wherein at least one of the first or second rolling bodies are guided by a cage.

4. A bearing element for two spatial directions, comprising
a sequence of first rolling bodies which roll on a first side of an intermediate part in a first direction,
a sequence of second rolling bodies which roll on a second side of the intermediate part and on a fastening part in a second direction which differs from the first direction,
the fastening part having a shank, and
a spring element being arranged around the shank, wherein the intermediate part has a planar configuration.

5. The bearing element as claimed in claim 4, wherein the spring element which surrounds the shank comprises a disk spring or a helical spring.

6. The bearing element as claimed in claim 4, wherein at least one of the first or second rolling bodies are guided by a cage.

7. The bearing element as claimed in claim 4, wherein at least one of the first or the second rolling bodies are configured as needles.

* * * * *